US009100830B2

(12) United States Patent
Kodama et al.

(10) Patent No.: US 9,100,830 B2
(45) Date of Patent: Aug. 4, 2015

(54) WIRELESS COMMUNICATION SYSTEM

(71) Applicant: Yokogawa Electric Corporation, Musashino-shi, Tokyo (JP)

(72) Inventors: Kazutoshi Kodama, Tokyo (JP); Hirotsugu Gotou, Tokyo (JP); Hiroki Yoshino, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 236 days.

(21) Appl. No.: 13/857,732

(22) Filed: Apr. 5, 2013

(65) Prior Publication Data
US 2013/0267164 A1 Oct. 10, 2013

(30) Foreign Application Priority Data
Apr. 9, 2012 (JP) .................. 2012-088653

(51) Int. Cl.
*H04B 7/14* (2006.01)
*H04W 12/08* (2009.01)
*H04W 4/20* (2009.01)

(52) U.S. Cl.
CPC .............. *H04W 12/08* (2013.01); *H04W 4/206* (2013.01)

(58) Field of Classification Search
CPC ...................................... H04W 12/08
USPC .............................. 455/7, 517, 411, 416, 90.2
See application file for complete search history.

(56) References Cited

U.S. PATENT DOCUMENTS

| 2008/0301052 A1* | 12/2008 | Yonge et al. ..................... 705/50 |
| 2011/0213900 A1* | 9/2011 | Nakamoto et al. ................ 710/8 |
| 2012/0036568 A1* | 2/2012 | Kodama ............................ 726/7 |

OTHER PUBLICATIONS

Shuji Yamamoto et al., "Field Wireless Solution Based on ISA 100.11a to Innovate Instrumentation" Yokogawa Technical Report English Edition, 2010, pp. 69-74, vol. 53, No. 2.
Shuji Yamamoto et al., "World's First Wireless Field Instruments Based on ISA100.11a", Yokogawa Technical Report English Edition, 2010, pp. 75-78, vol. 53, No. 2.

* cited by examiner

*Primary Examiner* — Sanh Phu
(74) *Attorney, Agent, or Firm* — Sughrue Mion, PLLC

(57) ABSTRACT

A wireless communication system for communicating via a wireless communication network, may include: a setting device configured to create a first information needed for joining a wireless device into the wireless communication network and set the first information in the wireless device to be joined into the wireless communication network, the setting device being configured to create setting information that correlates the first information with a second information containing at least one of information indicating a method of setting the first information and information indicating an operator who performed an operation of setting the first information; and a management device configured to select the wireless device, which is to be joined into the wireless communication network, by using the setting information that has been created by the setting device.

8 Claims, 6 Drawing Sheets

WIRELESS COMMUNICATION SYSTEM

BACKGROUND OF THE INVENTION

1. Field of the Invention

The present invention relates to a wireless communication system capable of wirelessly communicating via a wireless communication network.

Priority is claimed on Japanese Patent Application No. 2012-088653, filed Apr. 9, 2012, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

Recently, wireless field devices (measuring devices, operating devices) capable of wireless communication are installed at plants, factories, and such like, and a wireless communication system that communicates control signals for controlling these wireless field devices, measurement signals obtained from them, and such like, via a wireless communication network, is implemented. One example of a communication standard used in such wireless communication systems is ISA 100.11a, a wireless communication standard for industrial automation developed by the International Society of Automation (ISA).

To allow a wireless device such as one of these wireless field devices to join the wireless communication network, the wireless device must be subjected to a procedure known as 'provisioning', in which information it needs when joining the wireless communication network is set beforehand. Information set during provisioning includes, for example, the ID of the wireless communication network that the wireless device is joining, a join key corresponding to a password needed when joining, etc.

Provisioning methods broadly divide into over-the-air (OTA) provisioning and out-of-band (OOB) provisioning. OTA provisioning is a method of performing provisioning via the wireless communication network that the wireless device is attempting to join. In contrast, OOB provisioning is a method of performing provisioning using a different communication means from the wireless communication network that the wireless device is attempting to join (e.g. infrared communication or serial communication such as RS-232C).

OTA provisioning methods are categorized as 'OTA symmetric' provisioning, performed by transmitting information encrypted with a symmetric key encryption scheme to the wireless device, and 'OTA public key infrastructure (PKI)' provisioning, performed by transmitting information encrypted with a public key encryption scheme to the wireless device. Specifically, in 'OTA symmetric', the provisioning device (the device that provisions the wireless device) uses a symmetric key to encrypt the information to be set in the wireless device, and the wireless device uses a symmetric key to decrypt the information from the provisioning device. In contrast, in 'OTA PKI', the provisioning device uses a public key to encrypt the information to be set in the wireless device, and the wireless device uses a secret key to decrypt the information from the provisioning device.

"Field Wireless Solution Based on ISA100.11a to Innovate Instrumentation", Shuji Yamamoto et al., Yokogawa Technical Report English Edition Vol. 53, No. 2, 2010 (also published in Yokogawa Technical Report Vol. 53, No. 2, 2010, in Japanese) and "World's First Wireless Field Instruments Based on ISA100.11a", Shuji Yamamoto et al., Yokogawa Technical Report English Edition Vol. 53, No. 2, 2010 (also published in Yokogawa Technical Report Vol. 53, No. 2, 2010, in Japanese) disclose examples of wireless communication systems wherein a control signal for controlling the wireless field devices, measurement signals obtained by the wireless field devices, and other such signals, are transmitted and received via a wireless communication network compliant with the ISA100.11a communication standard mentioned above, and a provisioning device (device parameter-setting tool) that provisions a wireless field device allowed to join a wireless communication network.

However, since reliability and safety are important at plants, factories, and such like, a wireless communication system realized at such facilities must maintain adequate security. The OTA provisioning mentioned above is performed via the wireless communication network that the wireless device is attempting to join, and there is a possibility that a malicious person will intercept the communication content and wrongly provision the wireless device. Therefore, in OTA provisioning, security is maintained by encrypting the information transmitted to the wireless device in the manner described above.

In contrast, the OOB provisioning mentioned above is performed using a serial communication such as infrared communication or RS-232C, and it is thought that the communication content will not be intercepted by a malicious person. Therefore, in OOB provisioning, unless a malicious person actually enters the plant, factory, or such like, goes to the place where the wireless device is installed, and wrongly provisions it, it is inconceivable that the wireless device will be wrongly provisioned. Thus, in OOB provisioning, security is maintained by performing provisioning using a different communication means from the wireless communication network.

However, while the 'OTA PKI' method of OTA provisioning can maintain security unless the secret key set in the wireless device is leaked, the 'OTA symmetric' method encrypts using an existing symmetric key, and thus there is a possibility that the communication content will be intercepted during provisioning. If that happens, there is a possibility that the wireless device will be wrongly provisioned and security will deteriorate.

At plants, factories, and such like, a plurality of operators alternate as they perform operations, and thus there is a possibility that a malicious person may sneak in. If a malicious person sneaks in, since he has easy access to the places where wireless devices are installed, there is a possibility that a wireless device will be wrongly provisioned and security will deteriorate.

SUMMARY

A wireless communication system for communicating via a wireless communication network, may include: a setting device configured to create a first information needed for joining a wireless device into the wireless communication network and set the first information in the wireless device to be joined into the wireless communication network, the setting device being configured to create setting information that correlates the first information with a second information containing at least one of information indicating a method of setting the first information and information indicating an operator who performed an operation of setting the first information; and a management device configured to select the wireless device, which is to be joined into the wireless communication network, by using the setting information that has been created by the setting device.

The setting information that has been created by the setting device may be encrypted by using a predetermined encryption method. The management device may be configured to decrypt the setting information that has been created by the management device so as to select the wireless device that is joined into the wireless communication network.

The management device may include an input device configured to receive input conditions for selecting the wireless device that is joined into the wireless communication network.

The second information may include time information indicating a time at which the first information is set in the wireless device. The management device may be configured to use the setting information including the newest of the time information if there is a plurality of the setting information for a single wireless device.

The second information may include time information indicating a time at which the first information is set in the wireless device. The wireless communication system may further include: a server device configured to accumulate the setting information that has been created by the setting device, the server device being configured to use the setting information including the newest of the time information if there is a plurality of the setting information for a single wireless device.

The wireless communication system may further include: a control device configured to perform a join process of joining a wireless device, which has been selected by the management device, into the wireless communication network.

The wireless communication system may further include: a routing device configured to perform wireless communication compliant with ISA100.11a wireless communication standard between the wireless device and the control device, the routing device being configured to transmit messages and routing information of the wireless communication network and relay data transmitted/received between the wireless device and the control device.

The control device may include: a gateway unit configured to perform wireless communication compliant with ISA100.11a wireless communication standard, the gateway unit being configured to connect the wireless communication network to a wired plant network that the management device is connected to, the gateway unit being configured to relay various types of data transmitted/received between the wireless device the management device.

The control device may include: a security manager unit configured to store at least one of a whitelist of the wireless device, which has been allowed to be joined into the wireless communication network, and a blacklist of the wireless device, which has been forbidden from being joined into the wireless communication network, and refers to at least one of the whitelist and the blacklist so as to manage the wireless device that is joined into the wireless communication network.

The control device may further include: a system manager unit configured to manage and control wireless communication performed via the wireless communication network by managing and controlling resources of at least one of frequency channels, communication schedules, and communication paths of the wireless communication network, the system manager unit being configured to perform a join process of joining the wireless device into the wireless communication network by referring to at least one of the whitelist and the blacklist that has been stored in the security manager unit.

A wireless communication method for communicating via a wireless communication network, may include: creating a first information needed for joining a wireless device into the wireless communication network and setting the first information in the wireless device to be joined into the wireless communication network; creating setting information that correlates the first information with a second information containing at least one of information indicating a method of setting the first information and information indicating an operator who performed an operation of setting the first information; and selecting the wireless device, which is to be joined into the wireless communication network, by using the setting information that has been created.

The setting information that has been created may be encrypted by using a predetermined encryption method. The wireless communication method may further include: decrypting the setting information that has been created so as to select the wireless device that is to be joined into the wireless communication network.

The wireless communication method may further include: receiving input conditions for selecting the wireless device that is to be joined into the wireless communication network.

The second information may include time information indicating a time at which the first information is set in the wireless device. The wireless communication method may further include: using setting information including the newest of the time information if there is a plurality of the setting information for a single wireless device.

The second information may include time information indicating a time at which the first information is set in the wireless device. The wireless communication method may further include: accumulating the setting information that has been created, and using setting information containing the newest of the time information if there is a plurality of the setting information for a single wireless device.

The wireless communication method may further include: performing a join process of joining the wireless device that has been selected into the wireless communication network.

The wireless communication method may further include: performing wireless communication compliant with ISA100.11a wireless communication standard with the wireless device; transmitting messages and routing information of the wireless communication network; and relaying data transmitted/received to/from the wireless device.

The wireless communication method may further include: performing wireless communication compliant with ISA100.11a wireless communication standard; connecting the wireless communication network to a wired plant network; and relaying various types of data transmitted/received to/from the wireless device.

The wireless communication method may further include: storing at least one of a whitelist of the wireless device, which has been allowed to be joined into the wireless communication network, and a blacklist of the wireless device, which has been forbidden from being joined into the wireless communication network; and referring to at least one of the whitelist and the blacklist so as to manage the wireless device that is joined into to the wireless communication network.

The wireless communication system may further include: managing and controlling wireless communication performed via the wireless communication network by managing and controlling resources of at least one of frequency channels, communication schedules, and communication paths of the wireless communication network; and performing a join process of joining the wireless device into the wireless communication network by referring to at least one of the whitelist and the blacklist that has been stored.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

Figure 1:
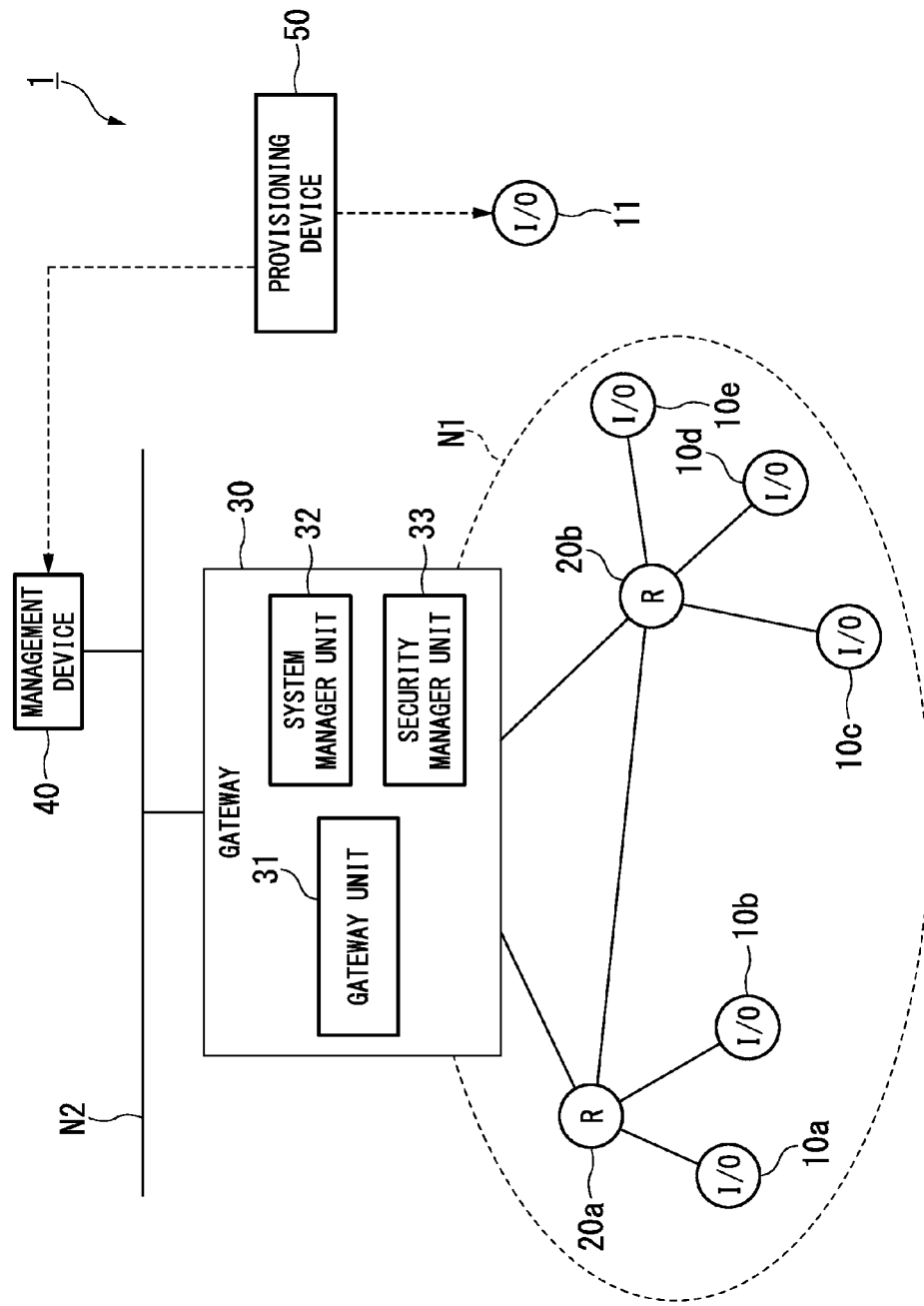
FIG. 1 is a block diagram illustrating the overall configuration of a wireless communication system in accordance with the first preferred embodiment of the present invention.

A wireless communication system in accordance with a first preferred embodiment of the present invention will be explained in detail with reference to the drawings. FIG. 1 is a block diagram illustrating the overall configuration of a wireless communication system in accordance with the first preferred embodiment of the present invention. As shown in FIG. 1, a wireless communication system 1 of the first preferred embodiment includes I/O devices 10a to 10e (wireless devices), an I/O device 11 (wireless device), routing devices 20a and 20b, a gateway 30 (control device), a management device 40, and a provisioning device 50 (setting device), and enables the I/O devices 10a to 10e and the management device 40 to communicate with each other via a wireless communication network N1, under the control of the gateway 30. The I/O devices 10a to 10e and 11 may be referred to as wireless devices. The gateway 30 may be referred to as a control device. The provisioning device 50 may be referred to as a setting device.

In FIG. 1, the I/O devices 10a to 10e belong to the wireless communication network N1, and the I/O device 11 is attempting to join it. The respective numbers of the I/O devices 10a to 10e, the I/O device 11, and the routing devices 20a and 20b are arbitrary.

The I/O devices 10a to 10e are field devices installed at a plant, factory, or the like, and include, for example, sensors such as flow meters and temperature sensors, valve devices such as flow control valves and on-off valves, and actuator devices such as fans and motors. The I/O devices 10a to 10e are capable of wireless communication compliant with ISA100.11a, a wireless communication standard for industrial automation.

The I/O devices 10a to 10e and the I/O device 11 each include an infrared communication function, and can transmit and receive various types of information to and from an external infrared communication device. Therefore, the I/O device 11 that does not belong to the wireless communication network N1 can perform infrared communication with the provisioning device 50 and acquire information needed for joining the wireless communication network N1. The information needed for joining the wireless communication network N1 includes, for example, a network ID allocated to the wireless communication network, a join key corresponding to a password needed when joining, etc.

The routing devices 20a and 20b perform wireless communication compliant with ISA100.11a with the I/O devices 10a to 10e and the gateway 30, transmitting messages and routing information of the wireless communication network N1, and relaying data that the I/O devices 10a to 10e and the gateway 30 transmit and receive to and from each other. The I/O devices 10a to 10e, the routing devices 20a and 20b, and the gateway 30 are wirelessly connected to each other, forming the star-mesh wireless communication network N1. Incidentally, instead of the routing devices 20a and 20b, an I/O device including the function of the routing devices 20a and 20b (relay function) can be provided.

The gateway 30 includes a gateway unit 31, a system manager unit 32, and a security manager unit 33, and controls communications performed by the wireless communication system 1. The gateway unit 31 connects the wireless communication network N1 formed by the I/O devices 10a to 10e and such like to a wired plant network N2 that the management device 40 is connected to, and relays various types of data that the I/O devices 10a to 10e and the like transmit and receive to and from the management device 40. The gateway unit 31 performs wireless communication compliant with the ISA100.11a wireless communication standard.

The system manager unit 32 manages and controls the wireless communications performed via the wireless communication network N1. Specifically, the system manager unit 32 manages and controls resources such as the frequency channels, communication schedules, and communication paths of the wireless communication network N1. Also, in cooperation with the security manager unit 33, the system manager unit 32 performs a join process of allowing the I/O device 11 to join the wireless communication network N1.

The security manager unit 33 manages security under the control of the system manager unit 32. For example, the security manager unit 33 stores a whitelist of I/O devices that have been permitted to join the wireless communication network N1, a blacklist of I/O devices that have been forbidden from joining it, etc. The security manager unit 33 refers to these lists in managing the I/O devices that belong to the wireless communication network N1. The system manager unit 32 refers to these lists stored in the security manager unit 33 in performing the join process mentioned above.

The management device 40 is connected to the wired plant network N2, and is operated by, for example, a manager of the wireless communication system 1. In accordance with commands from the manager, the management device 40 collects measurement data measured by the I/O devices 10a to 10e, sets parameters for the I/O devices 10a to 10e, and so on. In accordance with commands from the manager, the management device 40 reads a provisioning file created by the provisioning device 50, and uses provisioning information stored in this provisioning file in selecting an I/O device to be permitted to join the wireless communication network N1. The provisioning information stored in this provisioning file will be explained in more detail later.

To increase security, the provisioning file created by the provisioning device 50 is encrypted using a predetermined encryption method. Therefore, the management device 40 decrypts the provisioning file that it has read, and selects an I/O device using the provisioning information. The management device 40 is realized by a computer such as a personal computer, and enables selection conditions for selecting an I/O device to be input using input devices such as a keyboard and a mouse (not shown).

The provisioning device 50 is operated by, for example, an operator who installs the I/O device 11 that does not belong to the wireless communication network N1, and sets various types of information in the I/O device 11. Specifically, the provisioning device 50 creates information such as a join key needed for allowing the I/O device 11 to join the wireless communication network N1 (first information), provisions the I/O device 11, and sets the information in the I/O device 11.

The provisioning device 50 includes a wireless communication function compliant with the ISA100.11a wireless communication standard, an infrared wireless communication function, a serial communication function such as RS-232C, etc. The provisioning device 50 can therefore perform both OTA provisioning of the I/O device 11 via the wireless communication network N1 that the I/O device 11 is attempting to join, and OOB provisioning of the I/O device 11 using a communication means different from the wireless communication network N1 (infrared communication or serial communication such as RS-232C).

When performing provisioning, the provisioning device 50 can perform either 'OTA symmetric' or 'OTA PKI'. 'OTA symmetric' is OTA provisioning wherein information encrypted by a symmetric key encryption method is transmitted to the I/O device 11. 'OTA PKI' is OTA provisioning wherein information encrypted by a public key encryption method is transmitted to the I/O device 11.

The provisioning device 50 creates provisioning information (setting information) in which the information such as the join key set in the I/O device 11 during provisioning is correlated with relevant information relating to provisioning (second information). The provisioning device 50 stores the created provisioning information in a provisioning file, and encrypts the provisioning file using a predetermined encryption method for increasing security. Any encryption method can be used in encrypting the provisioning.

Figure 2:
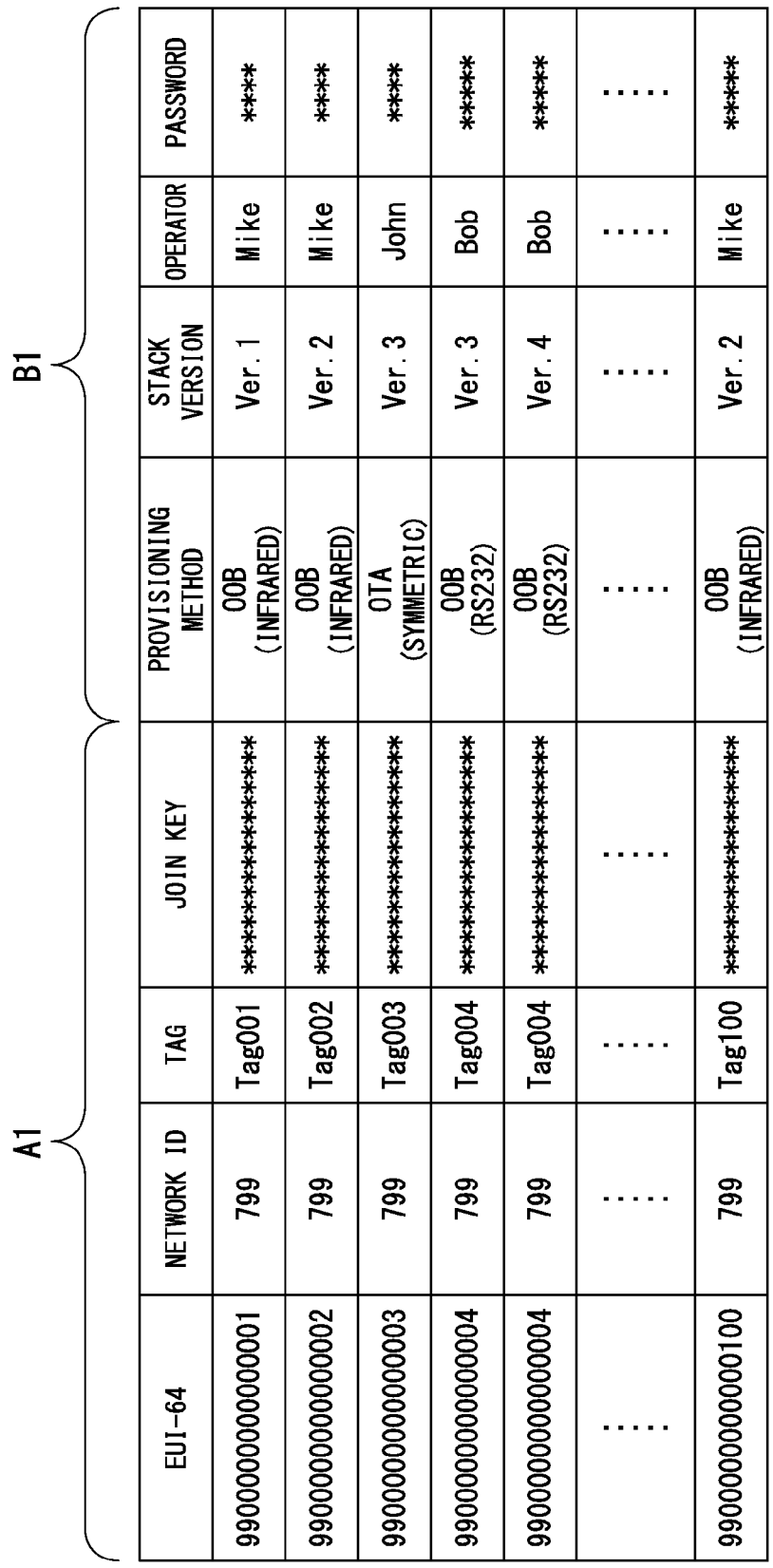
FIG. 2 is a diagram illustrating an example of provisioning information created in accordance with the first preferred embodiment of the present invention.

FIG. 2 is a diagram illustrating an example of provisioning information created in accordance with the first preferred embodiment of the present invention. As shown in FIG. 2, the provisioning information includes transmitted/received information A1, which is transmitted and received to and from the I/O device 11 during provisioning, correlated with relevant information B1 relating to provisioning. Provisioning information is created every time an I/O device 11 that does not belong to the wireless communication network N1 is provisioned.

The transmitted/received information A1 includes the items: 'EUI-64', 'Network ID', 'Tag' and 'Join key.' The 'EUI-64' is 64-bit information allocated to each of the I/O devices 11 so that they can be uniquely identified. The 'Network ID' is an ID allocated to the wireless communication network N1 that is attempting to allow the I/O devices 11 to join. The 'Tag' is information appended to each of the I/O devices 11 to make it easier for an operator to identify them.

The 'Join key' is information corresponding to a password that the I/O devices 11 need when joining the wireless communication network N1.

The provisioning device 50 acquires the 'EUI-64' from an I/O device 11 by communicating with that I/O device 11. The 'Network ID' and the 'Tag' are input to the provisioning device 50 by the operator who installs the I/O device 11. The 'Join key' is created by the provisioning device 50.

The relevant information B1 includes the items: 'Provisioning method', 'Stack version', 'Operator', and 'Password'. The 'Provisioning method' is information indicating the provisioning method for each I/O device 11 (information indicating method of setting first information), and includes one of 'OTA (symmetric)', 'OTA (PKI)', 'OOB (infrared)', and 'OOB (RS232)'. The 'Stack version' is information indicating the version of the stack provided in the I/O device 11.

The 'Operator' is information indicating the operator who performs the operation of provisioning each I/O device 11 (information indicating operator who performed operation of setting first information), and the 'Password' is information indicating a password that the operator needs in order to use the provisioning device 50. The 'Operator' and the 'Password' are input when the operator logs in to use the provisioning device 50.

Subsequently, an operation performed in the wireless communication system 1 having the configuration described above when an I/O device 11 that does not belong to the wireless communication network N1 is allowed to join it will be explained. To allow an I/O device 11 to join the wireless communication network N1, the I/O device 11 must first be provisioned, and the provisioned I/O device 11 is then allowed to join the wireless communication network N1. An operation of provisioning the I/O device 11 (operation when provisioning) and an operation when allowing a provisioned I/O device 11 to join the wireless communication network N1 (operation when joining) will be explained in that order.
(Operation when Provisioning)

Figure 3:
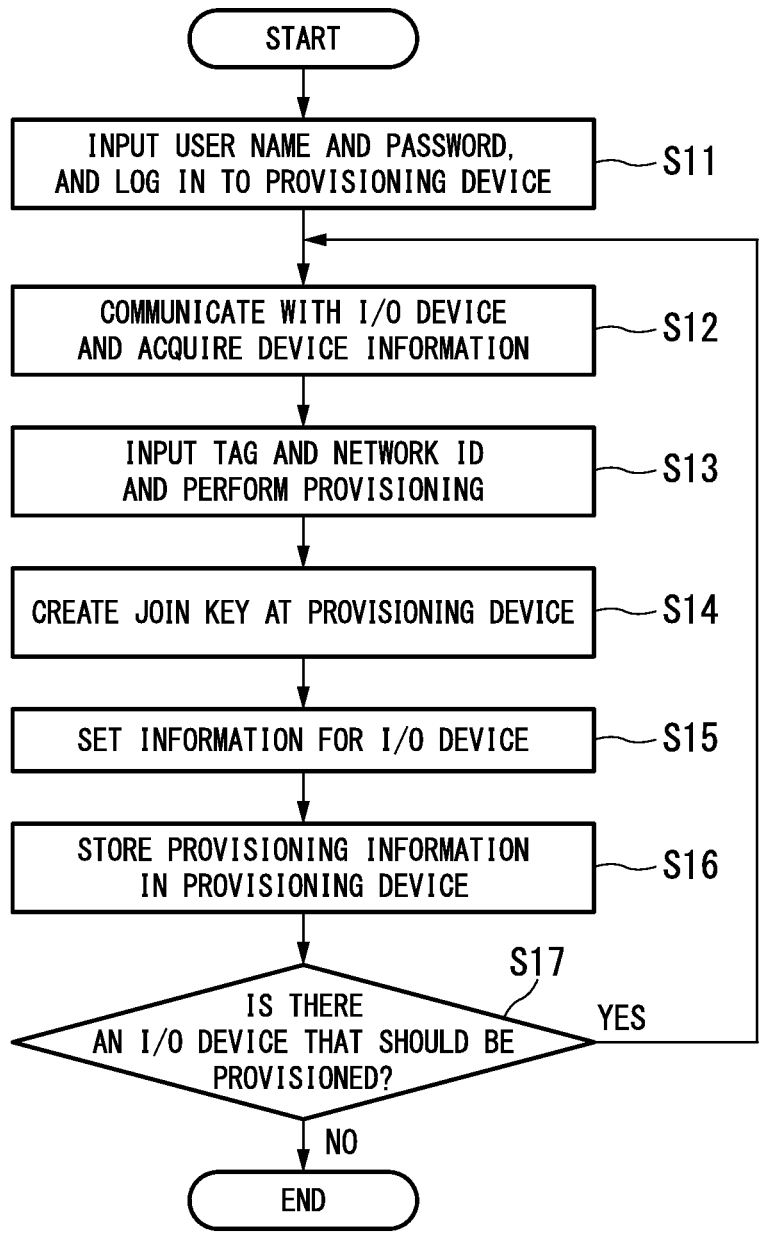
FIG. 3 is a flowchart illustrating an operation when provisioning in accordance with the first preferred embodiment of the present invention.

FIG. 3 is a flowchart illustrating an operation when provisioning in accordance with the first preferred embodiment of the present invention. Firstly, the operator manipulates the provisioning device 50 such as to input his name and password, and logs in to the provisioning device 50 (step S11). The provisioning device 50 is used by a plurality of operators, and log-in is required to prevent misuse of the provisioning device 50 by a malicious person. A different password for log-in is set for each operator.

When the operator has logged in to the provisioning device 50 and manipulates it to make a command to acquire device information, the provisioning device 50 communicates with the I/O device 11 and acquires the device information set by the provisioning device 50 (step S12). Specifically, the provisioning device 50 acquires address information such as the EUI-64 format of the 64-bit information allocated to the I/O device 11.

When it has acquired the device information, the provisioning device 50 displays an input screen requesting that the operator inputs (a) the tag to be appended to the I/O device 11 and (b) the network ID allocated to the wireless communication network N1 that is allowing the I/O device 11 to join. When the operator manipulates the provisioning device 50 and inputs the tag and the network ID to the input screen, the I/O device 11 is provisioned (step S13). To facilitate explanation, it is assumed that OOB provisioning using the infrared communication function is performed here.

When provisioning is carried out, the provisioning device 50 creates a join key (step S14). The tag and the network ID that were input in step S13 and the join key created in step S14 are then transmitted by infrared communication from the provisioning device 50 and received by the I/O device 11. The information needed for allowing the I/O device 11 to join the wireless communication network N1 is thus set in the I/O device 11 (step S15).

When provisioning of the I/O device 11 is complete, the provisioning device 50 creates and stores the provisioning information shown in FIG. 2 (step S16). Specifically, the provisioning device 50 uses the information set in the I/O device 11 (network ID, tag, join key) and the device information acquired in step S12 (the address information of the EUI 64 format) as the transmitted/received information A1 shown in FIG. 2. Also, the provisioning device 50 uses the information input in step S11 (the operator's name and password), information indicating the provisioning method, and information indicating the stack version provided to the I/O device 11 as the relevant information B1 shown in FIG. 2. The provisioning device 50 then creates and stores provisioning information correlating the transmitted/received information A1 with the relevant information B1.

When these processes end, the provisioning device 50 determines whether there is an I/O device 11 that should be provisioned, based on the command input by the operator (step S17). When it determines that there is an I/O device 11 that should be provisioned (when the determination result is YES), it repeats the processes of steps S12 to S16. On the other hand, when it determines that there is no I/O device 11 that should be provisioned (when the determination result is NO), the series of operations using the provisioning device 50 shown in FIG. 3 ends.

(Operation when Joining)

Figure 4:
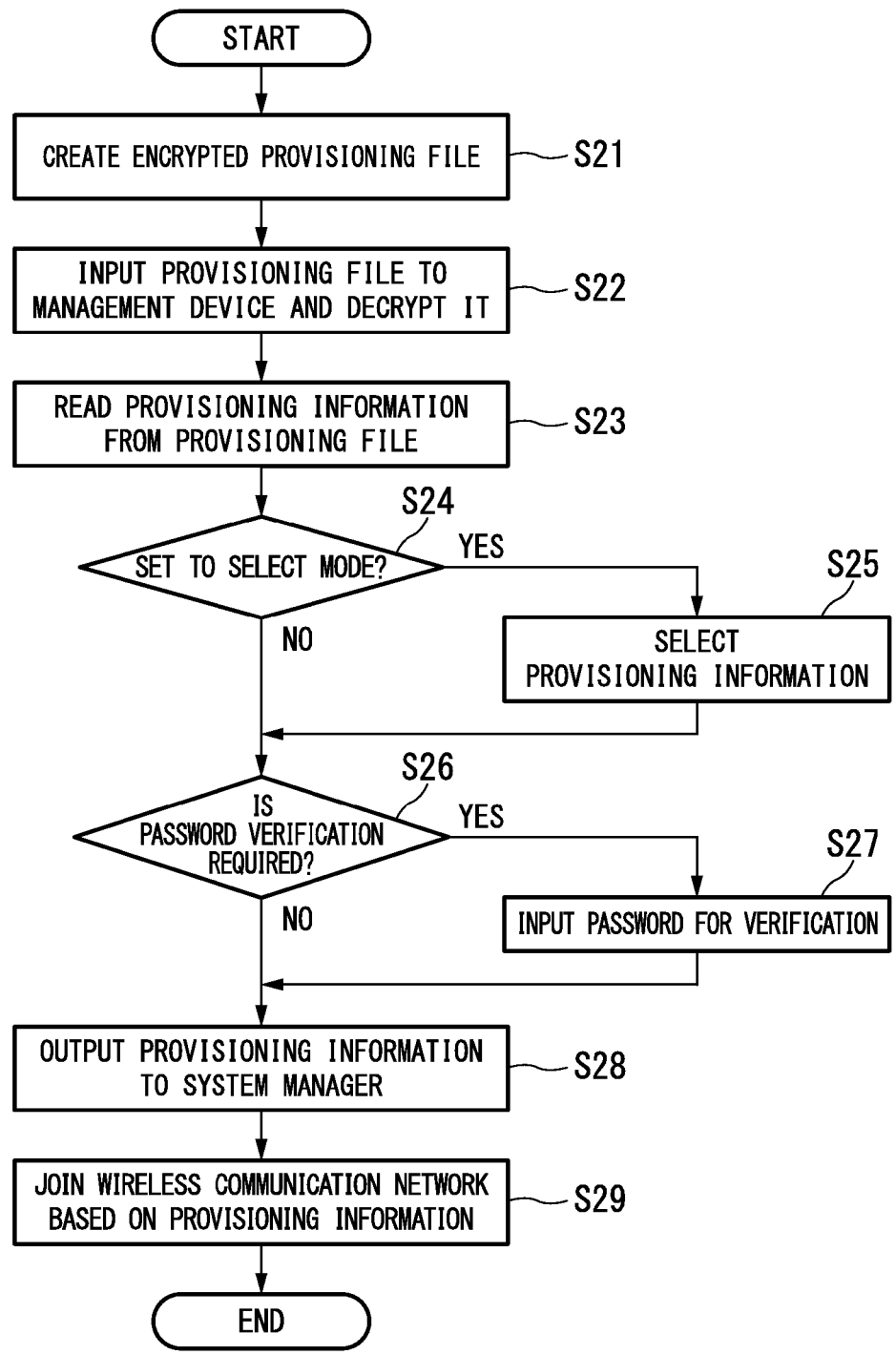
FIG. 4 is a flowchart illustrating an operation when joining in accordance with the first preferred embodiment of the present invention.

FIG. 4 is a flowchart illustrating an operation when joining in accordance with the first preferred embodiment of the present invention. Firstly, the provisioning device 50 creates an encrypted provisioning file (step S21). Specifically, the provisioning device 50 stores the provisioning information, which was stored after the I/O device 11 was provisioned, in a provisioning file, and encrypts it with a predetermined encryption key, thereby creating an encrypted provisioning file.

The provisioning file created by the provisioning device 50 is input to the management device 40 and decrypted (step S22), and the provisioning information stored in the provisioning file is read by the management device 40 (step S23). After reading the provisioning information, the management device 40 determines whether its own operating mode is set to the select mode (of automatically selecting provisioning information output to the security manager unit 33 of the gateway 30) (step S24).

When the management device 40 determines that its operating mode is set to the select mode (when the determination result of step S24 is YES), it selects the provisioning information read in step S23 based on the selection conditions input from an input device (not shown) such as a keyboard and a mouse (step S25). When it determines that its operating mode is not set to select mode (when the determination result of step S24 is NO), the management device 40 does not select any provisioning information.

Figure 5:
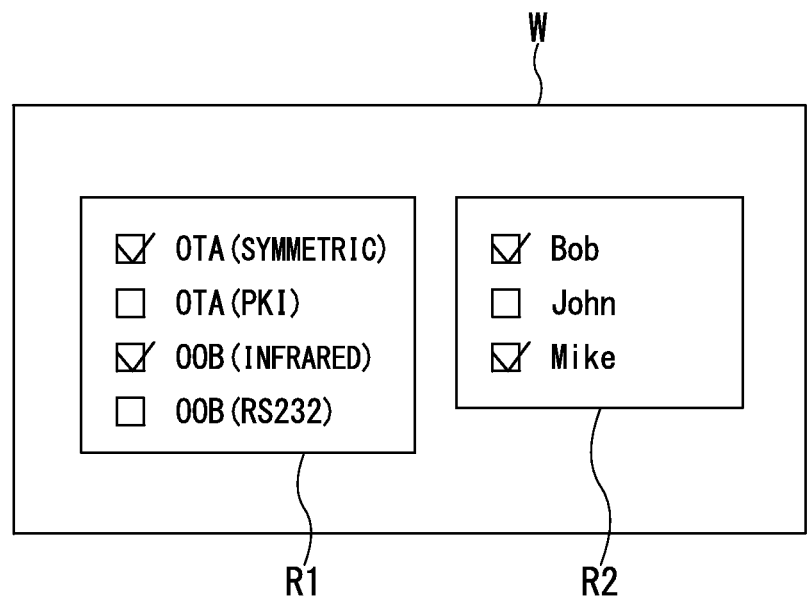
FIG. 5 is a diagram illustrating an example of a selection condition input screen of a management device in accordance with the first preferred embodiment of the present invention.

FIG. 5 is a diagram illustrating an example of a selection condition input screen of a management device in accordance with the first preferred embodiment of the present invention. The selection condition input screen W shown in FIG. 5 contains an input box R1 for inputting selection conditions relating to the provisioning method, and an input box R2 for inputting selection conditions relating to the operator. The input box R1 displays a list of the provisioning methods contained in the provisioning information that was read in step S23 (specifically: 'OTA (symmetric)', 'OTA (PKI)', 'OOB (infrared)', and 'OOB (RS232)') together with checkboxes. The input box R2 displays a list of the operators contained in the provisioning information that was read in step S23 (specifically: 'Bob', 'John', and 'Mike') together with checkboxes.

The manager who manipulates the management device 40 marks the checkboxes corresponding to the provisioning methods he wishes to select from the list of provisioning methods displayed in the input box R1. Similarly, he marks the checkboxes corresponding to the operators he wishes to select from the list of operators displayed in the input box R2. By performing these settings, provisioning information containing the provisioning methods that have been marked (in the example of FIG. 5, 'OTA (symmetric)' and 'OOB (infrared)'), and provisioning information containing the operators whose names have been marked (in the example of FIG. 5, 'Bob' and 'Mike') are selected.

After this process has ended, or when the management device 40 determines that its operating mode is not set to select mode (when the determination result of step S24 is NO), the management device 40 determines whether password verification is required to output the provisioning information to the security manager unit 33 of the gateway 30 (step S26). This setting can, for example, be performed on an initial screen when the management device 40 is activated.

When it determines that password verification is required (when the determination result in step S26 is YES), an input screen for inputting a password for verification is displayed at the management device 40. If the correct password is input to this input screen (step S27), it becomes possible to output the provisioning information to the security manager unit 33 of the gateway 30. Of course, the provisioning information cannot be output to the security manager unit 33 of the gateway 30 unless the correct password is input. When the management device 40 determines that password verification is not required (when the determination result of step S26 is NO), it can output the provisioning information to the security manager unit 33 of the gateway 30 without inputting a password.

When the process of step S27 has ended, or when it determines that password verification is not required (when the determination result of step S26 is NO), the management device 40 outputs the provisioning information to the security manager unit 33 of the gateway 30 (step S28). Specifically, when the management device 40 determines that the operating mode is not set to select mode (when the determination result of step S24 is NO), it outputs the provisioning information that was read in step S23. On the other hand, when it determines that the operating mode is set to select mode (when the determination result of step S24 is YES), it outputs the provisioning information that was selected in step S25.

When this process is performed, the provisioning information for the I/O device 11 that has been permitted to join the wireless communication network N1 is stored in the security manager unit 33 of the gateway 30. Therefore, when a join request from an I/O device 11 whose provisioning information has been stored in the security manager unit 33 makes a join request, a join process for that I/O device 11 is performed under the control of the system manager unit 32 (step S29).

As described above, in the first preferred embodiment, the provisioning device 50 creates provisioning information, wherein the transmitted/received information A1 transmitted and received to and from the I/O device 11 during provisioning is correlated with the relevant information B1 relating to the provisioning, and the management device 40 uses this provisioning information created by the provisioning device 50 in selecting an I/O device 11 to be permitted to join the wireless communication network N1. Thus, I/O devices that have been wrongly provisioned (e.g. I/O devices that have been provisioned using provisioning methods that are not permitted, or I/O devices that have been provisioned by unknown operators, etc.) are prevented from joining the wireless communication network N1, and security can be increased.

In the first preferred embodiment, since the provisioning file created by the provisioning device 50 is encrypted, even if the provisioning file is taken outside, the provisioning information stored in the provisioning file can be prevented from being leaked to the outside, and security can thereby be maintained. In addition, in the first preferred embodiment, since a setting can be made such that password verification is required when outputting the provisioning information from the management device 40 to the security manager unit 33, security can be increased.

Figure 6:
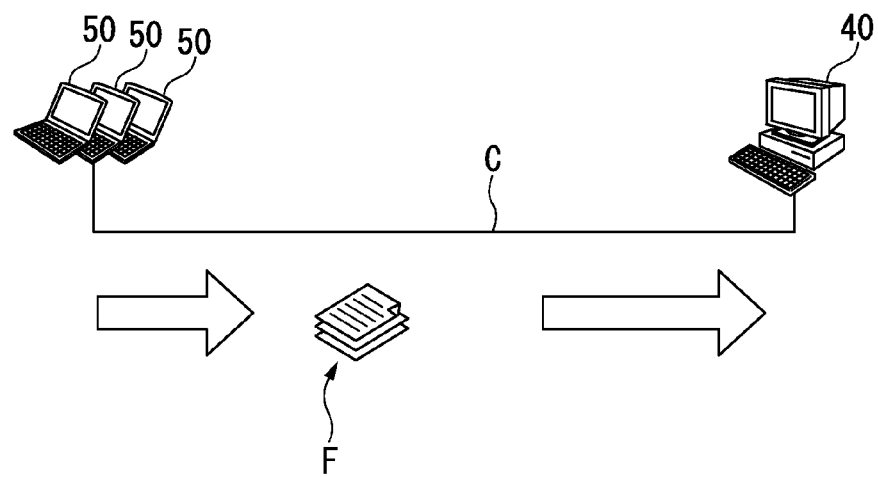
FIG. 6 is an explanatory diagram of a first modification of a communication system in accordance with the first preferred embodiment of the present invention.

FIG. 6 is an explanatory diagram of a first modification of a communication system in accordance with the first preferred embodiment of the present invention. As shown in FIG. 6, in this modification, the provisioning device 50 and the management device 40 are connected by a cable C, such as a universal serial bus (USB) cable or a local area network (LAN) cable, and the provisioning file F created by the provisioning device 50 is input to the management device 40 via the cable C.

Since provisioning operations at plants and the like are often performed by a plurality of operators using a plurality of provisioning devices 50, as shown in FIG. 6, there are cases where a plurality of provisioning devices 50 are connected to the management device 40 via the cable C at different times. In such cases, a situation may arise where a plurality of provisioning files F relating to a single I/O device 11 are input to the management device 40. For example, there are cases where provisioning is newly performed, and information set in an I/O device 11 that has already been provisioned is changed. In that case, if pre-changed provisioning information is selected at the management device 40, there is a possibility of a problem occurring when that I/O device is allowed to join the wireless communication network N1.

In this modification, the relevant information in the provisioning information created by the provisioning device 50 contains time information indicating the time at which provisioning was performed, and, when a plurality of provisioning files F for a single I/O device 11 are input to the management device 40, the management device 40 uses the one with the provisioning information containing the newest time information. By using the provisioning information with the newest time information, provisioning information with old time information becomes invalid, as it were, thereby preventing the problems mentioned above.

Figure 7:
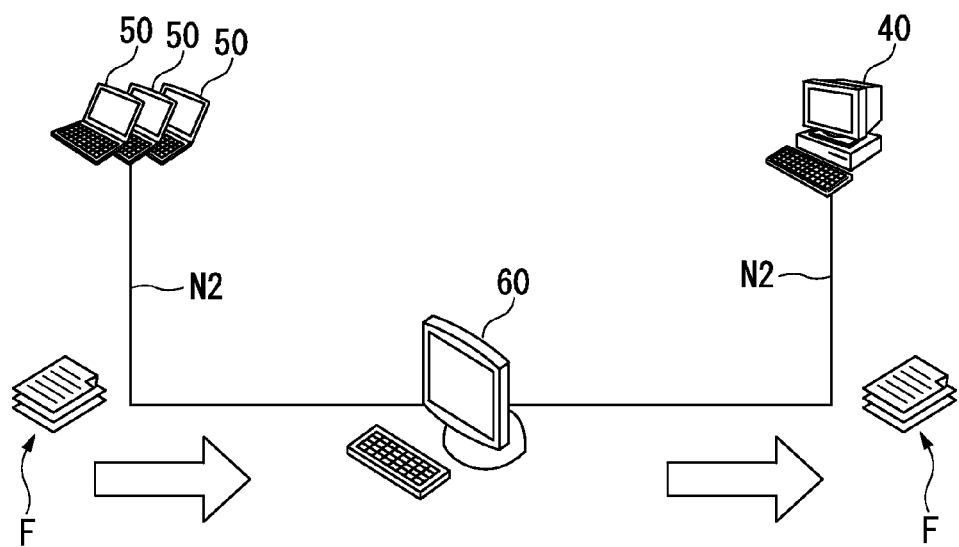
FIG. 7 is an explanatory diagram of a second modification of the wireless communication system in accordance with the first preferred embodiment of the present invention.

FIG. 7 is an explanatory diagram of a second modification of the wireless communication system in accordance with the first preferred embodiment of the present invention. As shown in FIG. 7, in this modification, the provisioning device 50 and a server device 60 are connected to the plant network N2 that the management device 40 is connected to. In this modification, as in the one above, the provisioning device 50 creates provisioning information that contains relevant information with time information indicating the time at which provisioning was performed.

The server device 60 accumulates the provisioning files F created by the provisioning devices 50, and supplies these accumulated provisioning files F to the management device 40 in accordance with requests from the management device 40. When it has accumulated provisioning files F for a single I/O device 11, the server device 60 supplies the one with the provisioning information containing the newest time information to the management device 40. As in the first modification, provisioning information with old time information becomes invalid, as it were, and the problems mentioned in the first modification are thereby prevented.

While a wireless communication system in accordance with a preferred embodiment of the present invention has been described above, the present invention is not limited to the foregoing preferred embodiment, and can be changed freely within the scope of the present invention. For example, while in the foregoing preferred embodiment, the example is one where the relevant information B1 in the provisioning information created by the provisioning device 50 contains information indicating the method for provisioning the I/O device 11 ('Provisioning method') and information indicating the operator who performs the provisioning of the I/O device 11 ('Operator'), it can contain just either one of these.

Furthermore, in the foregoing preferred embodiment, the gateway unit 31, the system manager unit 32, and the security manager unit 33 are provided in the gateway 30. However, the functions of the gateway unit 31, the system manager unit 32, and the security manager unit 33 can be realized using a separate device for each. Moreover, the function of wirelessly communicating with the I/O devices 10a to 10e and the routing devices 20a and 20b can be made independent from the gateway unit 31 and realized by a wireless access point device.

Furthermore, in the foregoing preferred embodiment, the provisioning device 50 can be used in 'OTA symmetric' provisioning, performed by transmitting information encrypted using a symmetric key encryption scheme to the wireless device. However, since 'OTA symmetric' is encrypted using an existing symmetric key, there is a possibility that the communication content will be intercepted during provisioning. Accordingly, it is preferable to limit the output of the wireless signal output from the provisioning device 50 and restrict the range of the wireless signal, thereby reducing the possibility that the communication content will be intercepted during provisioning.

The present invention provides a wireless communication system that can increase security by preventing wrongly provisioned wireless devices from joining a wireless communication network.

According to a preferred embodiment of the preferred embodiment of the present invention, a setting device creates setting information correlating first information set in a wireless device with second information containing at least one of information indicating a method of setting the first information and information indicating an operator who performed the operation of setting the first information, and a management device uses this setting information in selecting a wireless device to be allowed to join a wireless communication network. It is therefore possible to provide a wireless communication system that can increase security by preventing wireless devices that have been wrongly provisioned from joining the wireless communication network.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A wireless communication system for communicating via a wireless communication network, comprising:
   a setting device configured to create a first information needed for joining a wireless device into the wireless communication network and set the first information in the wireless device to be joined into the wireless communication network, the setting device being configured to create setting information that correlates the first information with a second information containing at least one of information indicating a method of setting the first information and information indicating an operator who performed an operation of setting the first information; and
   a management device configured to select the wireless device, which is to be joined into the wireless communication network, by using the setting information that has been created by the setting device, wherein
   the second information includes time information indicating a time at which the first information is set in the wireless device, and
   the management device is configured to use the setting information including the newest of the time information if there is a plurality of the setting information for a single wireless device.

2. The wireless communication system according to claim 1, wherein
   the setting information that has been created by the setting device is encrypted by using a predetermined encryption method, and
   the management device is configured to decrypt the setting information that has been created by the management device so as to select the wireless device that is joined into the wireless communication network.

3. The wireless communication system according to claim 1, wherein the management device comprises an input device configured to receive input conditions for selecting the wireless device that is joined into the wireless communication network.

4. A wireless communication system for communicating via a wireless communication network, comprising:
   a setting device configured to create a first information needed for joining a wireless device into the wireless communication network and set the first information in the wireless device to be joined into the wireless communication network, the setting device being configured to create setting information that correlates the first information with a second information containing at least one of information indicating a method of setting the first information and information indicating an operator who performed an operation of setting the first information; and
   a management device configured to select the wireless device, which is to be joined into the wireless communication network, by using the setting information that has been created by the setting device, wherein
   the second information includes time information indicating a time at which the first information is set in the wireless device, and
   the wireless communication system further comprises:
   a server device configured to accumulate the setting information that has been created by the setting device, the server device being configured to use the setting information including the newest of the time information if there is a plurality of the setting information for a single wireless device.

5. A wireless communication system for communicating via a wireless communication network, comprising:
   a setting device configured to create a first information needed for joining a wireless device into the wireless communication network and set the first information in the wireless device to be joined into the wireless communication network, the setting device being configured to create setting information that correlates the first information with a second information containing at least one of information indicating a method of setting the first information and information indicating an operator who performed an operation of setting the first information;
   a management device configured to select the wireless device, which is to be joined into the wireless communication network, by using the setting information that has been created by the setting device; and
   a control device configured to perform a join process of joining a wireless device, which has been selected by the management device, into the wireless communication network,
   wherein the control device comprises:
   a security manager unit configured to store at least one of a whitelist of the wireless device, which has been allowed to be joined into the wireless communication network, and
   a blacklist of the wireless device, which has been forbidden from being joined into the wireless communication network, and refers to at least one of the whitelist and the blacklist so as to manage the wireless device that is joined into the wireless communication network.

6. The wireless communication system according to claim 5, further comprising:
   a routing device configured to perform wireless communication compliant with ISA100.11 a wireless communication standard between the wireless device and the control device, the routing device being configured to transmit messages and routing information of the wireless communication network and relay data transmitted/received between the wireless device and the control device.

7. The wireless communication system according to claim 5, wherein the control device comprises:
   a gateway unit configured to perform wireless communication compliant with ISA100.11 a wireless communication standard, the gateway unit being configured to connect the wireless communication network to a wired plant network that the management device is connected to, the gateway unit being configured to relay various types of data transmitted/received between the wireless device the management device.

8. The wireless communication system according to claim 5, wherein the control device further comprises:
a system manager unit configured to manage and control wireless communication performed via the wireless communication network by managing and controlling resources of at least one of frequency channels, communication schedules, and communication paths of the wireless communication network, the system manager unit being configured to perform a join process of joining the wireless device into the wireless communication network by referring to at least one of the whitelist and the blacklist that has been stored in the security manager unit.

* * * * *